(12) United States Patent
Vest

(10) Patent No.: US 7,347,024 B1
(45) Date of Patent: Mar. 25, 2008

(54) DECOY SYSTEM

(76) Inventor: Ronald K. Vest, 8704 Picture Ridge Rd., Peoria, IL (US) 61615

( * ) Notice: Subject to any disclaimer, the term of this patent is extended or adjusted under 35 U.S.C. 154(b) by 500 days.

(21) Appl. No.: 10/995,992

(22) Filed: Nov. 22, 2004

Related U.S. Application Data

(60) Provisional application No. 60/545,765, filed on Feb. 18, 2004.

(51) Int. Cl.
*A01M 31/06* (2006.01)
(52) U.S. Cl. .......................................................... 43/3
(58) Field of Classification Search ................. 43/2, 43/3; 224/249, 103, 920, 921
See application file for complete search history.

(56) References Cited

U.S. PATENT DOCUMENTS

| | | | |
|---|---|---|---|
| 970,003 A | 9/1910 | Wethall | |
| 1,836,504 A | 12/1931 | Prince | |
| 2,242,509 A * | 5/1941 | Coalson | 43/57.3 |
| 2,616,200 A | 11/1952 | Milam | 43/3 |
| 2,633,661 A * | 4/1953 | Stevens et al. | 43/57.3 |
| 4,141,167 A * | 2/1979 | Muehl | 43/2 |
| 4,248,368 A | 2/1981 | Lindsay | 224/249 |
| 5,074,071 A | 12/1991 | Dunne | 43/3 |

OTHER PUBLICATIONS

Maverick Adjustable Trotline Carrier-Holder, Maverick Manufacturing Company, Clarksville, Texas, 75426 @ www.mavericktx.com/trotline.

* cited by examiner

*Primary Examiner*—Kimberly S. Smith
(74) *Attorney, Agent, or Firm*—Philip L. Bateman

(57) ABSTRACT

Decoys are placed, retrieved, and stored in a system that contains a line assembly and a holder. The line assembly contains: (1) a main line having an anchor at each end and a stop member attached to the line a spaced distance from the anchor; and (2) a plurality of decoy lines connected at their proximate ends to the main line at spaced intervals. Each decoy line is adapted for connection to a decoy at its distal end and has a stop member attached to the line a spaced distance from the distal end. The holder is a tube having a longitudinal slot extending from the inlet end substantially the entire length of the tube. The slot has a width about equal to or greater than the main line and less than the stop members. The tube has a diameter and a length sufficient to accommodate the main line, the decoy lines, and the stop members within its interior.

6 Claims, 3 Drawing Sheets

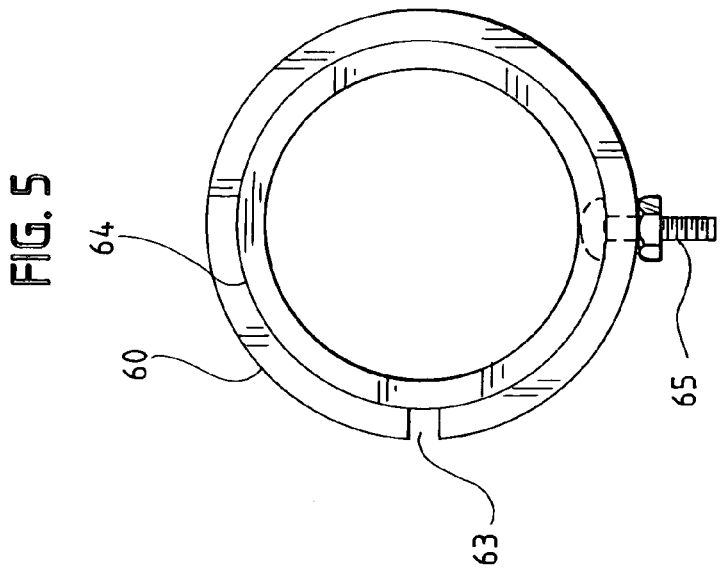
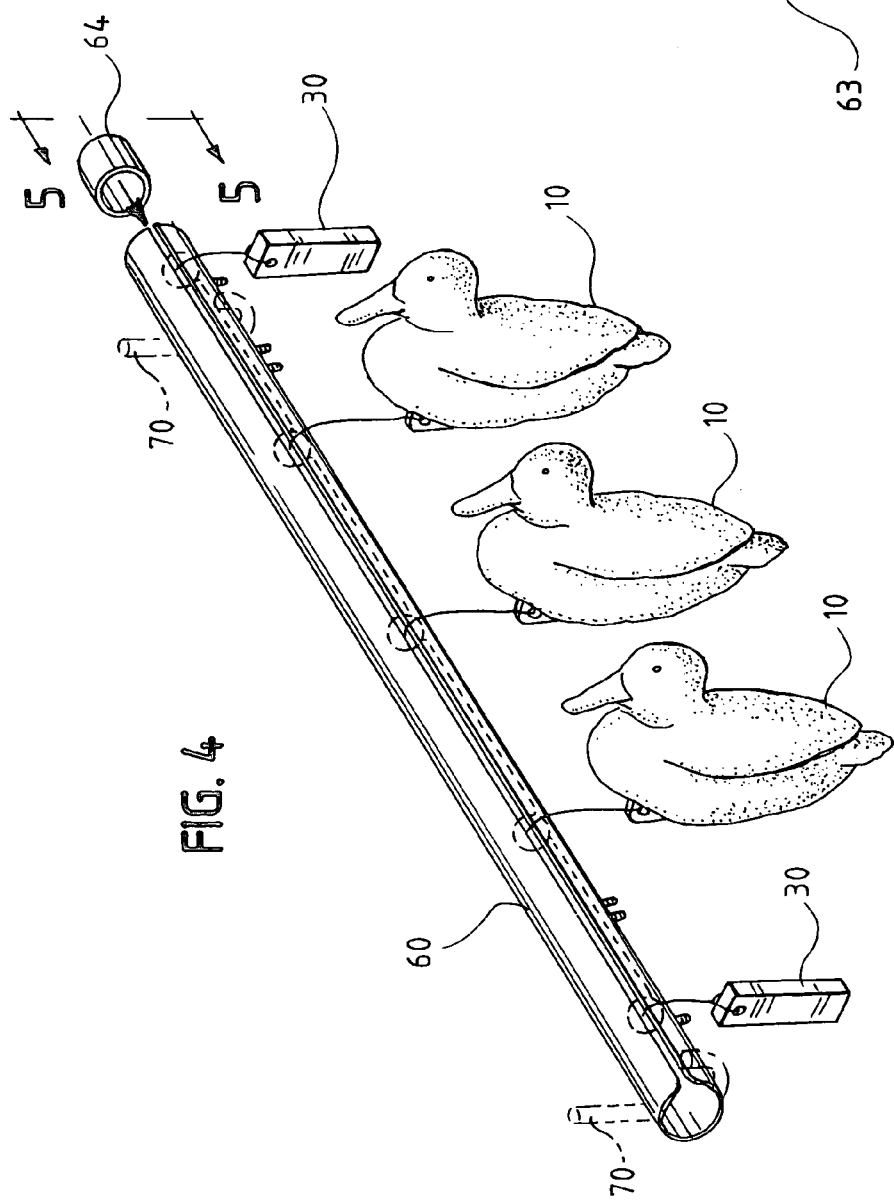

DECOY SYSTEM

CROSS-REFERENCE TO RELATED APPLICATION

This application claims the benefit of U.S. Provisional Application Ser. No. 60/545,765, Feb. 18, 2004.

FIELD OF THE INVENTION

This invention relates to decoys for hunting waterfowl. More particularly, this invention relates to a system for placing, retrieving, and storing decoys.

BACKGROUND OF THE INVENTION

Hunting waterfowl such as ducks and geese is a popular recreational activity. Hunters routinely place (also referred to as "deploy") decoys on bodies of water to attract the flying waterfowl to land. Referring to FIG. 1, a decoy 10 is a floating three-dimensional model of a waterfowl. The decoy contains a keel 11 with a fitting (typically a hole) on its underside. The decoy is retained in place by connecting a line 20 from the fitting to an anchor 30 that rests on the bottom of the body of water. Hunters frequently connect multiple decoys together in an assembly as shown in FIG. 2 and as described in more detail in Prince, U.S. Pat. No. 1,836,504, issued Dec. 15, 1931. In such an assembly, each individual decoy line 20 is connected to a fitting 40 on a main line 50 rather than to an anchor. The main line is, in turn, anchored at both ends.

The process of placing and retrieving a multiple decoy assembly is time consuming. To retrieve the assembly, the individual decoy lines are separated from the main line and then wound around each individual decoy. The main line is then wound separately. Each decoy and its line are placed in bags for storage. The bags are then generally placed in boxes.

A variety of multiple decoy assemblies have been disclosed. For example, Wethall, U.S. Pat. No. 970,003, issued Sep. 13, 1910; Milam, U.S. Pat. No. 2,616,200, issued Nov. 4, 1952; and Dunne, U.S. Pat. No. 5,074,071, issued Dec. 24, 1991; disclose multiple decoy assemblies having rods or bars that connect the decoys together. The decoys are removed from the Wethall and Dunne assemblies for storage, but are left connected in the Milam assembly. In the Milam assembly, the position of the decoys is fixed by the length of the connecting rods. The length of the connecting rods also fixes the size of the assembly when stored.

A holder for individual decoys is disclosed in Lindsay, U.S. Pat. No. 4,248,368, issued Feb. 3, 1981. The Lindsay decoy holder is a base with a slot. Individual decoys with attached weights are suspended form the base. A trotline carrier-holder is sold by Maverick Manufacturing Company of Clarksville, Tex. The trotline carrier-holder is a tube with a slot and with a rod suspended inside the tube. The hooks in the trotline are positioned around the rod and extend outward through the slot.

Accordingly, there is a demand for an improved decoy placement, retrieval, and storage system. In particular, there is a demand for a multiple decoy system that can be used with any decoys, that can be placed and retrieved easily and quickly, that allows flexibility in the distances between the individual decoys, that reduces tangling of lines, that takes up little space when stored or transported, and that leaves the individual decoys accessible when stored so they can be repainted or repaired easily.

SUMMARY OF THE INVENTION

The general object of this invention is to provide an improved multiple decoy placement, retrieval, and storage system. More particular objects are to provide a multiple decoy system that can be placed and retrieved easily and quickly, that can be used with any decoys, that allows flexibility in the distances between the individual decoys, that reduces tangling of lines, that takes up little space when stored or transported, and that leaves the individual decoys accessible when stored so they can be repainted or repaired easily.

I have invented a system for placing, retrieving, and storing a plurality of decoys. The system comprises a line assembly and a holder. The line assembly comprises: (1) a main line having two ends and a diameter, each end having an anchor and a stop member with an effective diameter attached to the line a spaced distance from the anchor; and (2) a plurality of decoy lines, each decoy line having a proximate end and a distal end and a diameter, the decoy lines being connected at their proximate ends to the main line at spaced intervals, each decoy line adapted for connection to a decoy at its distal end, each decoy line having a stop member with an effective diameter attached to the line a spaced distance from the distal end. The holder comprises a tube having an inlet end, a closed end, a length, and an interior, the tube having a longitudinal slot extending from the inlet end substantially the entire length of the tube, the slot having a width about equal to or greater than the diameter of the main line and less than the effective diameter of the stop members, the tube having a diameter and a length sufficient to accommodate the main line, the decoy lines, and the stop members within its interior.

The decoy system of this invention enables a plurality of decoys to be placed and retrieved easily and quickly. The decoy system can be used with any decoys, allows flexibility in the distances between the individual decoys, reduces tangling of lines, takes up little space when stored or transported, and leaves the individual decoys accessible when stored so they can be repainted or repaired easily.

BRIEF DESCRIPTION OF THE DRAWINGS

FIG. 4 is a perspective view thereof in its storage position.

FIG. 5 is an end view of the tube of the decoy system.

DETAILED DESCRIPTION OF THE INVENTION

Figure 1:
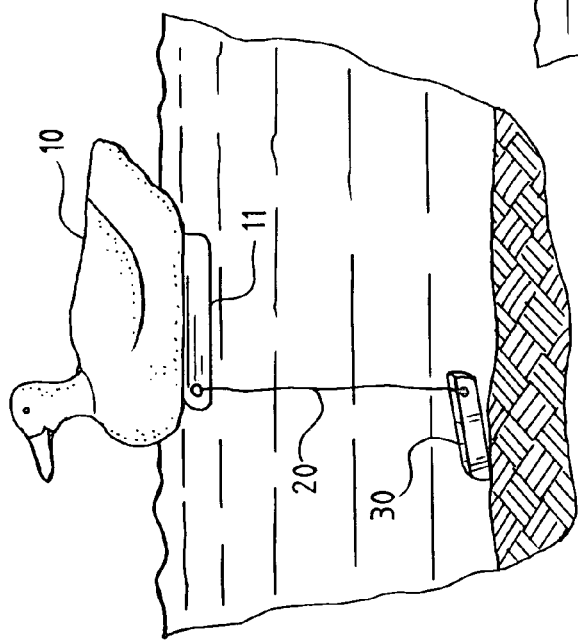
FIG. 1 is an elevation view of a prior art decoy placed in a body of water.
Figure 2:
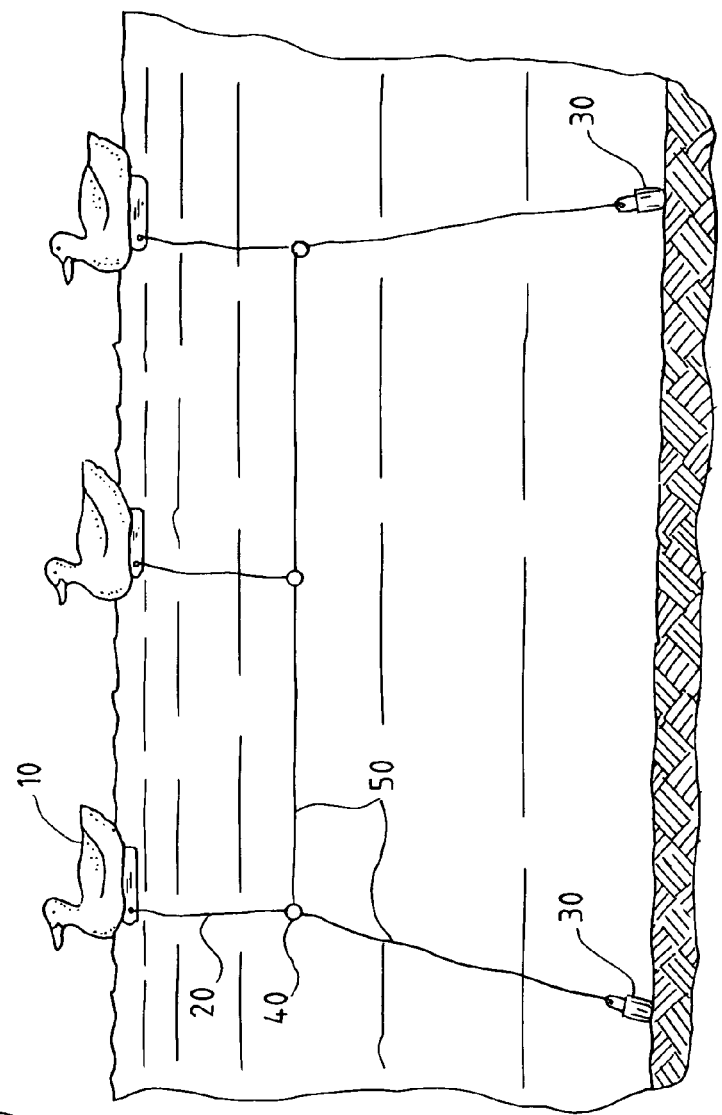
FIG. 2 is an elevation view of a prior art multiple decoy assembly placed in a body of water.
Figure 3:
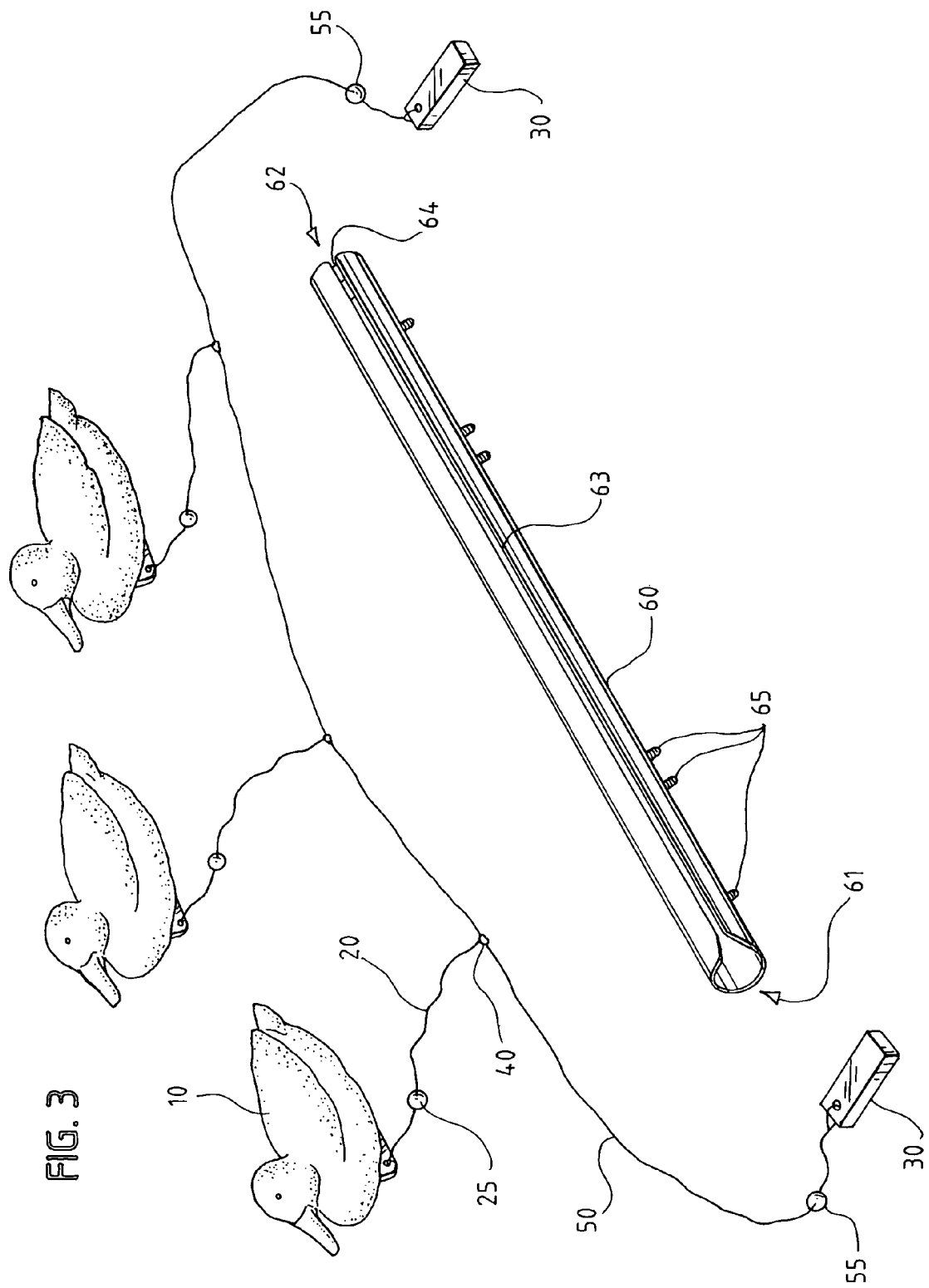
FIG. 3 is a perspective view of the decoy system of this invention in a position representing its deployed position.

This invention is best understood by reference to the drawings. Referring to FIG. 3, the decoy system of this invention comprises two major components. The first major component is a decoy assembly comprising a plurality of decoys 10, a plurality of decoy lines 20, two anchors 30, a plurality of connectors 40, and a main line 50. The second major component is a holder 60 for the decoy assembly. These components are discussed in detail below.

The decoys 10 are conventional. They are generally floating three-dimensional models of waterfowl having fittings on their underside, although non-floating field decoys are also suitable. Decoys are available from a large number of suppliers. Many hunters have their own decoys and prefer to use them with the rest of the decoy system of this invention. For this reason, the decoy system of this invention is generally sold without decoys. Accordingly, decoys need not be considered parts of the invention.

A decoy line 20 runs from each decoy to the main line 50. The decoy lines are generally connected to the main line using conventional connectors 40 such as knots, hooks, clamps, clasps, rings, and the like. Such connectors enable the length of the main line and the spaces between the decoy lines to be easily changed as desired. The end of the decoy line connected to the main line is referred to herein as the proximate end and the end connected to the decoy is referred to as the distal end.

The decoy lines are made of a durable waterproof material. Natural materials and synthetic materials are both suitable. The diameter of the decoy lines is generally about 1/16 to 1/8 inch, preferably about 3/32 inch. The preferred decoy line is a No. 36 tarred nylon twine. The tarring gives the twine a stiffness that reduces tangling. The tarring also gives the twine a camouflaged appearance and a texture that makes knots hold better. The length of the decoy lines is a matter of choice depending in part on the depth of the body of water where the decoys will be placed. The number of decoy lines is a matter of choice. In FIGS. 3 and 4, only three decoys are shown for illustration. In practice, the number of decoys is generally about six to thirty-six.

The main line is also made of a durable waterproof material. The diameter of the main line is generally about 1/8 to 1/4 inch, preferably about 3/16 inch. The preferred main line is a camouflaged braided nylon rope. The length of the main line is also a matter of choice which is dependent on the number of decoys, the spacing desired between the decoys, and the depth of the body of water where the decoys will be placed.

A stop member 25 is attached to each decoy line a spaced distance from its distal end. As explained in detail below, the stop member is stored in the holder tube. The stop member is a three-dimensional body, preferably a sphere. If a sphere, the stop member generally has a diameter of about one-half to two inches. If not a sphere, the smallest dimension of the stop member (referred to herein as the effective diameter) is generally about one-half to two inches. In the preferred embodiment, the stop member is a sphere having a diameter of about 3/4 inch that is made of solid plastic. A hole runs through the sphere and the decoy line is threaded through the hole and then attached with knots, clamps, or the like. The stop member is generally positioned about two to twelve inches, preferably about three to four inches, from the decoy. As explained in detail below, the location of the stop member determines the distance the decoy will hang from the tube during storage.

Each end of the main line contains an anchor 30. A wide variety of commercially available anchors are available and are suitable for use in this invention. A stop member 55 is attached a spaced distance from each anchor. The stop members on the main line are generally of the same construction as the stop members on the decoy lines. The stop members on the main line are generally positioned about two inches to three feet from the anchors. As explained in detail below, the position of the stop member varies according to the depth of the water where the decoy assembly will be placed. The position also determines the distance the anchors will hang from the tube during storage.

The second major component of the decoy system of this invention is a holder tube 60. The tube holds the decoy assembly, with the exception of the decoys and the anchors, in its interior during transportation and storage. The tube is made of a durable waterproof material. Suitable materials include plastics and metals. Preferred materials are plastics such as polyvinylchloride (PVC), high density polyethylene (HDPE), and the like. The tube generally has an outside diameter of about one and to four inches, preferably about two to three inches. A preferred material for the holder tube is a nominal two inch diameter PVC electrical conduit having a wall thickness of about 3/16 inch. The length of the tube is a matter of choice. The preferred length is dependent upon the number of decoys to be stored. In general, the tube is about four to six inches long per decoy. For example, if eight decoys are to be stored, the tube is generally about thirty-two inches to four feet long, if twelve decoys, about four to six feet, and if twenty-four decoys, about eight to twelve feet. Tubes up to about seven feet long fit into the bed of most pick-up trucks. Tubes longer than seven feet are more difficult to transport.

The tube has an inlet end 61 and a closed end 62. As discussed below, the lines and stop members of the decoy assembly are inserted into and removed from the inlet end. The stop members cannot fit through the closed end. The tube has a longitudinal slot 63 that extends from the inlet end substantially or all the length of the tube. The slot has a width of about 3/32 to 5/32 inch, preferably about 1/8 inch. The slot is preferably of a width that just allows the decoy and main lines to pass through. Because a nylon line deforms, the width of the slot may be equal to or even slightly less than the nominal diameter of the line. By minimizing the width of the slot, the chances that unwanted parts of the lines will extend out through the slot and become tangled are minimized. In the preferred embodiment, the width of the slot tapers outwardly at the inlet end to ease insertion of the lines of the decoy assembly. The closed end contains a partial or complete barrier to prevent the decoy assembly from sliding out. A partial barrier is preferred so water can escape. As best seen in FIGS. 4 and 5, the preferred embodiment contains a bushing 64 glued to the inside of the tube to serve this purpose.

Several different types of fittings are optionally present. In the embodiment preferred for deep water decoy assemblies, the tube contains six pegs 65 consisting of nuts and bolts. The lines extending out from the slot and connected to the anchors can be wrapped around the pegs if desired. The tube can also contain one or more eyebolts, looped strings, or the like for attachment of the tube to a boat during placement or for attachment of the tube to a hook during storage, etc.

The use of the decoy system of this invention can now be considered. Referring again to FIG. 3, the decoy system is shown spread out in a position that illustrates its deployed position. The decoy assembly shown is suited for placement in a relatively shallow body of water because the distance from the end decoys to the anchors is relatively short. For use in a deep body of water, the length of the main line between the stop member and the anchor would be much longer so that the end decoys can float upon the surface while the anchors reach the bottom. The pegs in the holder tube are not used for a shallow water decoy assembly.

To store the decoy assembly in the holder tube, one of the stop members on the main line is inserted into the interior of the tube. The portion of the line running from the stop member to the anchor is positioned in the slot of the tube. The anchor is left outside the tube. The main line is then inserted into the tube until the first decoy is reached. The stop member on the decoy line is then inserted into the interior of the tube while leaving the decoy outside the tube. The process in repeated until the entire decoy assembly, except for the anchors and the decoys, are inside the tube as shown in FIG. 4. The decoy system can now easily be transported and stored. In FIG. 4, the decoy system is shown suspended from hooks 70 which are shown in phantom lines and which are not part of the invention. If the decoy assembly were intended for use in deep water, a much longer portion of the main line would extend out through the slot at each end. This line is conveniently wrapped around the pegs.

To place or deploy the decoys, the process is reversed. The decoy system is transported to the body of water where the decoys will be placed. The hunter then wades into the water or goes out in a boat. At the desired location, the hunter pulls out the stop member attached to the anchor nearest the inlet end of the holder tube. The anchor is then dropped into the water. As the hunter continues to move away, the remaining lines and decoys move out of the tube without tangling into the water. Finally, the last anchor is placed. The hunter can then go to the duck blind or other location and wait for the waterfowl to appear. The tube can be stored on the ground or boat during hunting. Alternatively, the holder tube can be used as part of a temporary duck blind by elevating the tube off the ground with supports and then draping camouflage materials over it.

As can be seen, the decoy system of this invention enables a plurality of decoys to be placed and retrieved easily and quickly. The decoy system can be used with any decoys, allows flexibility in the distances between the individual decoys, reduces tangling of lines, takes up little space when stored or transported, and leaves the individual decoys accessible when stored so they can be repainted or repaired easily.

I claim:

1. A method of retrieving and storing a decoy assembly that reduces tangling of lines, the method comprising:
    (a) obtaining a decoy assembly comprising a main line having two ends and a diameter, each end having an anchor and a stop member with a minimum dimension attached to the line a spaced distance from the anchor; and a plurality of decoy lines, each decoy line having a proximate end and a distal end and a diameter, the decoy lines being connected at their proximate ends to the main line at spaced intervals, each decoy line connected to a decoy at its distal end, each decoy line having a stop member with a minimum dimension attached to the line a spaced distance between the distal end and the proximate end;
    (b) obtaining a holder tube comprising an inlet end, a closed end, a length, and an interior, the tube having a longitudinal slot extending from the inlet end substantially the entire length of the tube, the slot having a width about equal to or greater than the diameter of the main line and less than the minimum dimension of the stop members, the tube having a diameter and a length sufficient to accommodate the main line, the decoy lines, and the stop members within its interior; and
    (c) inserting the decoy assembly into the interior of the tube while positioning the anchors and the decoys outside the tube with the ends of the main line and the decoy lines passing through the slot so that all the decoy assembly, except for the anchors and decoys, is stored inside the tube where it is protected from tangling; and
    (d) wherein each said stop member has a width, height and length being substantially equal.

2. The method of claim 1 wherein the stop members comprise spheres having a diameter of about one-half to two inches.

3. The method of claim 2 wherein the stop members on the decoy lines are spaced about two to twelve inches from the distal ends.

4. The method of claim 3 wherein the tube has a diameter of about one to four inches and a length of about two to twelve feet.

5. The method of claim 4 wherein the slot in the tube tapers outwardly at the inlet end.

6. The method of claim 5 wherein the closed end of the tube comprises a partial barrier.

\* \* \* \* \*